O. F. SIRE.
DYNAMO ELECTRIC MACHINE.
APPLICATION FILED JAN. 31, 1911.

1,138,254. Patented May 4, 1915.
2 SHEETS—SHEET 1.

WITNESSES
INVENTOR
Octave François Sire
ATTY

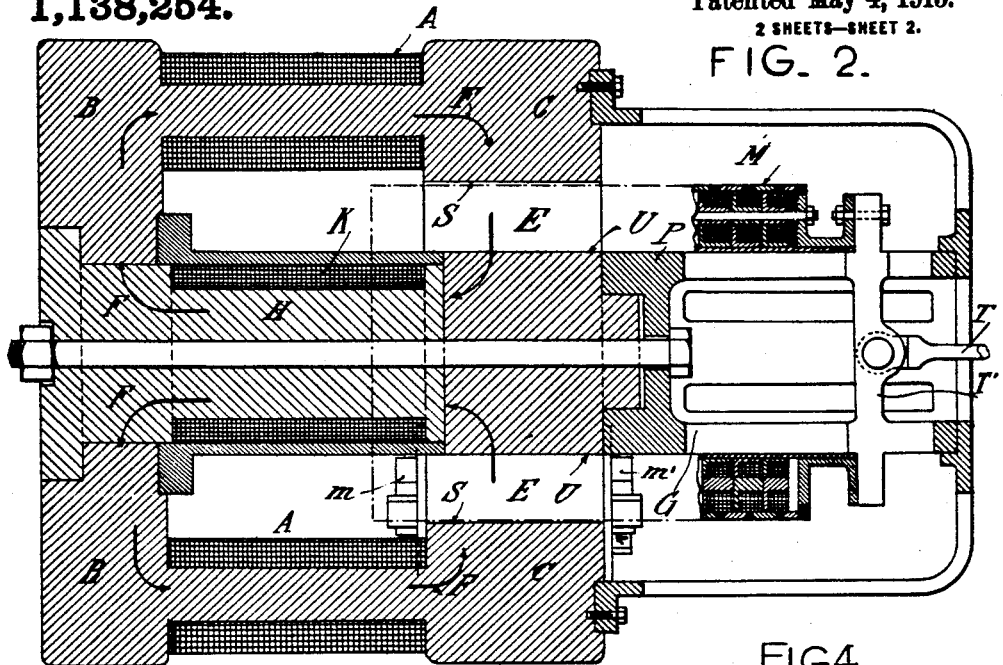
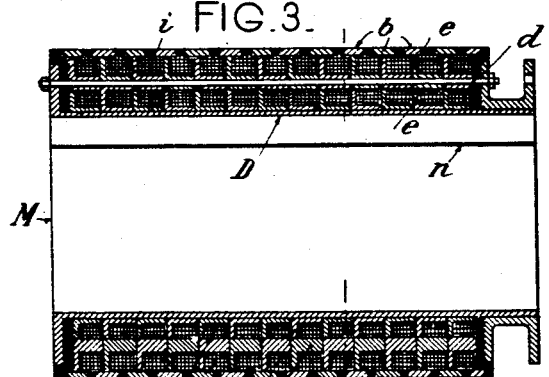
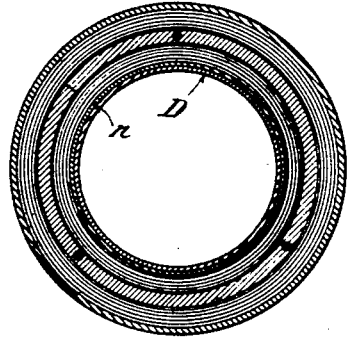
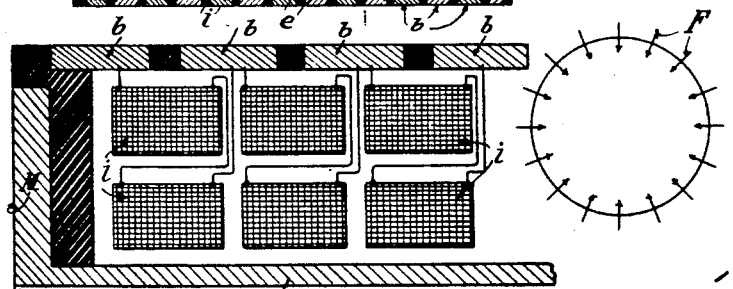

EXAMINER'S ROOM.

UNITED STATES PATENT OFFICE.

OCTAVE FRANÇOIS SIRE, OF PARIS, FRANCE.

DYNAMO-ELECTRIC MACHINE.

1,138,254.  Specification of Letters Patent.  Patented May 4, 1915.

Application filed January 31, 1911. Serial No. 605,805.

*To all whom it may concern:*

Be it known that I, OCTAVE FRANÇOIS SIRE, citizen of France, residing at 13 Avenue de Saint Mandé, Paris, in the Republic of France, have invented new and useful Improvements in Dynamo-Electric Machines, of which the following is a specification.

This invention relates to improvements in dynamo and electric machines. In the improved dynamo the translatory movement of a coil movable in a magnetic field of radial lines of force is utilized in such a manner that only the sections of this coil lying between the poles of the acting field magnets are in circuit during the movement.

The annexed drawings illustrate by way of example a form of construction of the machine.

Figure 1:
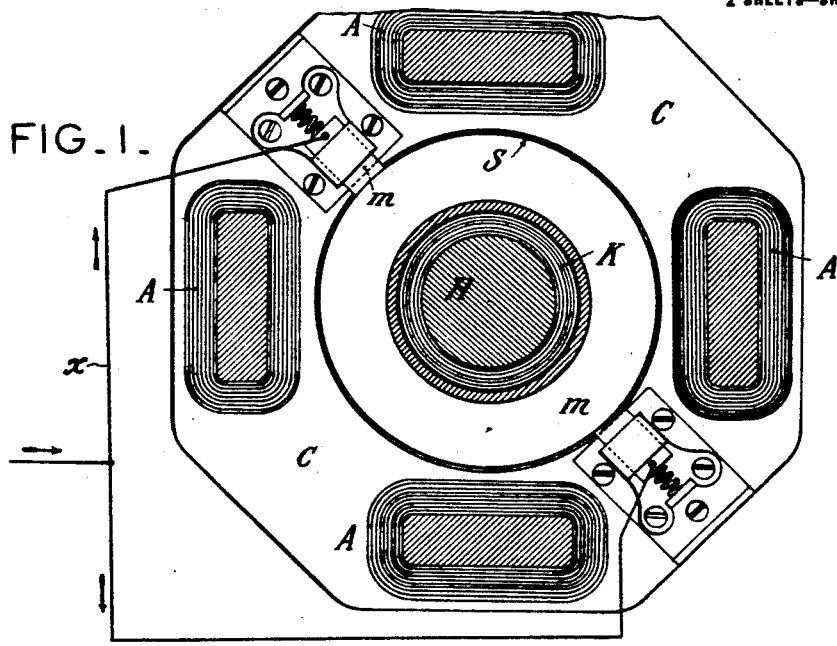
Figure 5:
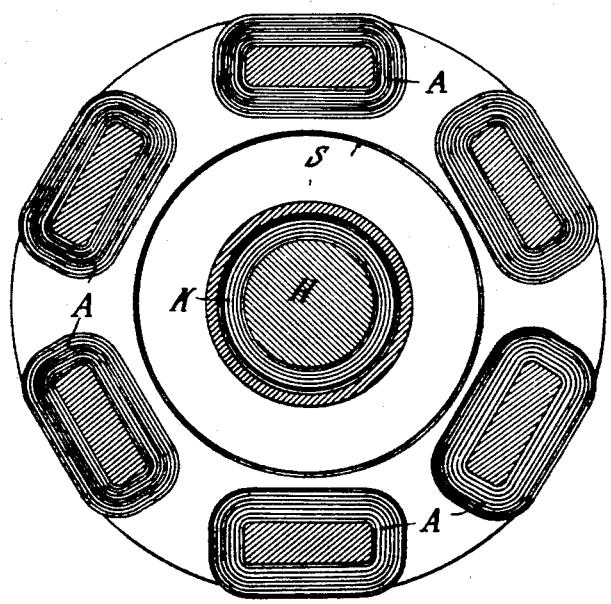

Figures 1 and 2 represent in transverse and longitudinal section the constitutive part of the fixed field magnets the movable part or armature being shown partly broken away. Figs. 3 and 4 represent in longitudinal and transverse sections the movable member or armature which receives the induced electric current. Fig. 5 shows in transverse section a modification of the fixed field magnets. Fig. 6 diagrammatically illustrates the lines of magnetic force the diagram being a cross section of the active field. Fig. 7 illustrates diagrammatically the connection of the coils of the armature.

The fixed field magnet is formed by a suitable number of electromagnets A (Figs. 1 and 5) arranged circularly around a central electromagnet HK.

In the annexed drawings is shown by way of example two constructions comprising respectively four and six peripheral magnets but it can be understood that the number can be increased if desired.

The electromagnets A abut at one end against a solid core B and at the other against a hollow core C in which the armature M slides. The polarity of the central electromagnet HK, is of contrary sign to that of the peripheral magnets A. A magnetic circuit is thus obtained the lines of force of which are indicated by the arrows F (Figs. 2 and 6).

The dynamic force acts in the space E comprised between the cylindrical surfaces S and U which constitute the poles of the acting field magnet.

The member which carries the induced electric circuit, that is to say the armature (Figs. 3 and 4) is formed by a soft iron drum D on which are mounted groups or sections of coils $i$ which are arranged on plates of iron or on flanged rings $e$ arranged side by side on the drum in an inner and outer concentric row. These coils are fixed in place by means of bolts $d$. Annular members $b$ insulated from one another and insulated from the coil unite the bobbin groups separately. Two superposed bobbins are connected together and constitute one group or coil section. The ends of the wire of one group are connected to two consecutive rings $b$. The armature is mounted on a cross bar T' guided on slots G formed on a fixed part P. This cross bar is connected to an operating rod T actuated by any suitable means so that the armature may be reciprocated.

On one of the lateral faces of the core C is fixed one or several brushes $m$ (two in the example of the drawing) insulated from said core and rubbing on the rings $b$, and on the opposite lateral face of the core is fixed a corresponding brush $m^1$ or series of brushes $m^1$ (Fig. 2). The brushes of each series are connected together by a wire $x$ as shown in Fig. 1. The current which arrives by one series of brushes traverses the group of bobbins situated in the field E and goes out by the opposite series of brushes.

To suppress Foucault currents the drum D is slit on its whole length along a generating line, as shown at $n$ in Fig. 4.

The advantage which the dynamo-electric system above described has with regard to analogous systems hitherto employed is the following: In known systems the armature as a whole is in circuit: the ampere turns of this coil which surround the central core are added algebraically to those of the field magnets which causes the magneto motive force of the field magnet circuit to vary with the position of the armature. With the device which forms the object of the present invention the variations of field which arise from this cause are on the contrary suppressed. The phenomena of induction only occurs in the space comprised between the surfaces of the poles.

The arrangement of the movable part illustrated in Figs. 3 and 4 comprises two coils or bobbins per group, but it is obvious that the invention may be applied as well to arrangements comprising a single bobbin or more than two bobbins per group.

The described apparatus can either be used to produce a movement under the influence of an electric action or it can be used to generate an electric current by the action of a reciprocating movement. In the first case, the movement is only produced in one direction, and, to reverse the latter, it is only necessary to reverse the direction of current in the armature by means of any of the well known apparatus employed for this purpose. The system may be compared to a dynamo in which the dynamic action instead of being a couple is a force of constant direction. Used as a motor a continuous current would be used and the coils of the field magnets and of the armature would be connected in series or in parallel according to their resistance and the electromotive force obtainable. As a generator of current the excitation of the field magnet is done from an independent source, the current obtained being alternating.

Having now described my invention, what I claim as new and desire to secure by Letters Patent is:

1. A dynamo electric machine comprising a fixed field magnet, a coil having a translatory movement in the magnetic field created by the field magnet, and divided into several sections, a series of insulated conductive rings surrounding the coil sections and connected respectively to two adjacent ends of said coil sections, and two series of brushes fixed to opposite faces of said field magnet adapted to rub upon the said ring, substantially as described and for the purpose set forth.

2. A dynamo electric machine comprising a fixed field magnet, a coil having a translatory movement in the magnetic field created by the field magnet and divided into several sections comprising each a plurality of superposed bobbins connected to each other, a series of insulated conductive rings surrounding the coil sections and connected respectively to two adjacent ends of said coil sections, and two series of brushes fixed to opposite faces of said field magnet adapted to rub upon the said ring, substantially as described and for the purpose set forth.

In testimony whereof I have signed my name to this specification in the presence of two subscribing witnesses.

OCTAVE FRANÇOIS SIRE.

Witnesses:
Louis Moses,
H. C. Coxe.

Copies of this patent may be obtained for five cents each, by addressing the "Commissioner of Patents, Washington, D. C."